United States Patent Office 3,442,627
Patented May 6, 1969

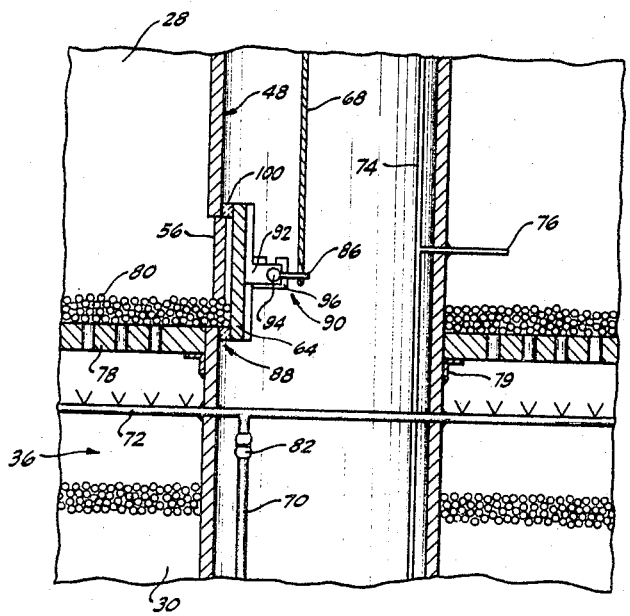
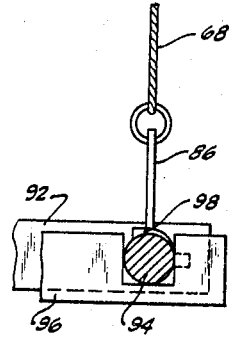
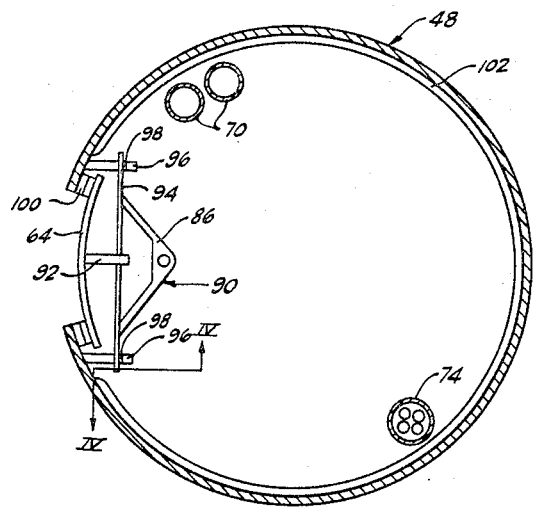
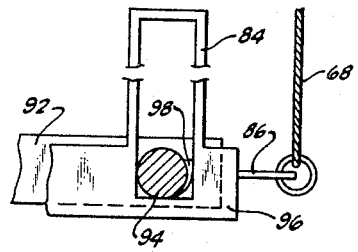
INVENTOR
HERBERT F. WILKINSON

3,442,627
CATALYST UNLOADING AND TEMPERATURE
CONTROL APPARATUS
Herbert F. Wilkinson, Fullerton, Calif., assignor to Union
Oil Company of California, Los Angeles, Calif., a corporation of California
Filed June 14, 1965, Ser. No. 463,604
Int. Cl. B01j 9/10
U.S. Cl. 23—289                                    12 Claims

ABSTRACT OF THE DISCLOSURE

Apparatus for effecting catalytic conversions comprising a cylindrical vessel, and an axial center pipe therein having closeable side wall openings for unloading catalyst, and serving also as a catalyst supporting means and as a pathway for fluid quench lines.

This invention relates to an improved apparatus for unloading catalyst from reactors and for controlling the internal temperature of high-pressure reactors wherein exothermic or endothermic reactions are carried out by passing fluid reactants therethrough.

Conventional apparatus for carrying out exothermic or endothermic catalytic reactions at high pressures generally comprises an elongated, cylindrical vessel enclosing and supporting one or more catalyst beds through which fluid reactants pass. The reactions are controlled by the addition of a temperature-control fluid directly into the reactant stream at one or more levels in the reactor. This temperature-control fluid is generally injected into the reactor by means of a series of nozzles which pass through the side walls of the reactor at successive levels within a single bed, or between spaced beds in multibed catalytic reactors. In addition to the injection nozzles, the side walls of the reactor usually contain large nozzles or manways through which spent catalyst may be removed. The use of such side nozzles and/or manways is expensive from a mere welding standpoint. Furthermore, for operation at high temperatures and pressures, construction codes often require much thicker vessel walls when side nozzles are utilized than are required when the side walls are smooth, thus adding greatly to the fabrication costs. Thick-walled vessels are not only expensive per se, but the great weight thereof places restrictions on the size of vessels which can be constructed and transported under present day fabricating procedures. Thus, for the dual purpose of reducing costs and enabling the construction of larger units, it would be highly desirable to completely eliminate side nozzles in high-pressure catalytic conversion reactors.

It is the principal object of this invention to provide an apparatus which readily permits the removal of catalyst from one or more catalyst beds of a high-pressure catalytic reactor, while eliminating the use of externally mounted, high-pressure, side nozzles and/or manways.

It is another object to provide an apparatus for distributing temperature-control fluids to one or more control zones of a high-pressure catalytic reactor without using externally mounted, high-pressure, side nozzles.

Still another object of the invention is to provide a central supporting structure for carrying a portion of the weight of the catalyst beds and other internal transverse structures, thus eliminating the necessity for large transverse supporting beams which normally reduce to a considerable extent the effective usable space within the reactor.

Other objects and advantages of this invention will be apparent from the description which follows.

Briefly, this invention comprises an elongated, cylindrical, high-pressure catalytic reactor in combination with an axially disposed, tubular catalyst unloading and temperature-control fluid injection apparatus. The tubular apparatus comprises a large conduit positioned axially within the reactor for unloading deactivated catalyst through the interior thereof, while at the same time affording a thermal barrier between the reaction zone and one or more smaller fluid-injection tubes enclosed therein for carrying temperature-control fluid to one or more temperature-control zones in the reactor. The apparatus conveniently replaces essentially all the externally mounted, high-pressure side nozzles heretofore required, thereby substantially reducing overall construction costs and simplifying design procedures.

In its simplest aspect, the tubular apparatus comprises a centrally positioned, elongated conduit disposed lengthwise within an upright catalytic reactor and communicating with the exterior of the reactor through the lower end wall. The conduit is vented to the interior of the reactor adjacent the lower end wall to prevent collapse of the conduit due to possible pressure differentials between the reactor section and the interior of the conduit. The vent also serves as a passageway to withdraw fluid products from the reactor. The conduit is provided with one or more apertures in the side wall thereof, through which the catalyst may be drained. During reactor operation the apertures are sealed by removable gate-like closure plates mounted internally of the conduit and provided with a locking mechanism. The conduit is preferably thermally insulated so as to minimize heat transfer to the included temperature-control fluid injection tubes. The fluid-injection tubes themselves may also be insulated. The exterior of the conduit may advantageously be provided with flanges or other like support members to aid in carrying the weight of the catalyst bed support trays, quench devices, and the like.

While the invention is broadly applicable to single bed reactors, it is preferred that the catalyst unloading and fluid injection apparatus be used in conjunction with multibed, catalytic reactors. In such a reactor, the conduit extends lengthwise from the bottom of the reactor to a position above the uppermost catalyst bed, usually adjacent the top of the reactor. The conduit, contains a number of apertures, each of which is positioned along the side wall of the conduit, preferably adjacent the lowermost portion of each catalyst bed. When large catalyst beds are utilized, it may be advantageous to position additional spaced apertures along the vertical extent of each bed. Additionally, a tube bundle is positioned lengthwise within the conduit extending upwardly from the bottom of the conduit, each tube communicating at a level adjacent one of the control or dispersal zones with a radial fluid distributing device which protrudes through the side wall of the conduit into the dispersal zone. When exothermic reactions are conducted it is preferred to thermally insulate the tube bundle. It may also be desirable to cool the interior of the conduit by passing a stream of hydrogen or other inert gas therethrough.

It is preferred that the terminal portion of each fluid injection tube be provided with a distributing device for achieving substantially uniform radial distribution of the temperature-control fluid in such a manner as to insure intimate and thorough mixing of the fluid with the reactant stream passing through the catalyst beds. Each distributing device is preferably attached to the end of each fluid injection tube through a deformable, bellows-shaped, annular coupling which allows the device to be rigidly affixed through a fluid-tight seal to the conduit wall. Such a coupling arrangement allows for differential thermal expansion and contraction.

As previously indicated, during operation the catalyst is prevented from draining to the interior of the conduit by removable gate-like closure plates which seal the apertures in the side wall of the conduit. It is preferred to use closure members which are readily locked into a sealing position by a cammed rod and lever arm such as shown in detail in FIGURES 2–5. When it is desired to remove the catalyst, the gate is simply unlocked and raised or rotated out of alignment with the aperture. The catalyst is then allowed to drain into the conduit, and is removed from the bottom through a suitable valve arrangement. Because the draining operation usually creates a funnel-like profile of catalyst, it will usually be necessary for a workman to enter the reactor to remove the remaining catalyst.

Additionally, it is within the scope of this invention to eliminate the reactant inlet at the top of the reactor by positioning a feed-delivery tube within the central conduit to transport the reactant stream from the bottom of the reactor to the top. The feed inlet tube terminates in the zone above the uppermost catalyst bed. The feed-inlet tube would require insulation in order to prevent heating of the adjacent temperature-control fluid tubes. Such an arrangement advantageously eliminates the use of the standard external high-pressure tubing generally required to conduct the fluid reactants from about ground level to the top of the reactor, i.e., usually about 100 feet.

During operation of the reactor, the temperature of each successive catalyst bed is independently controlled by introducing a quantity of temperature-control fluid in a dispersal zone between adjacent catalyst beds so as to regulate the temperature of the reactants passing from one bed to the next. This operation may be controlled automatically by embedding thermocouples in each catalyst bed and adjusting the flow of quench or heating fluid through inlet valves in response to the reaction temperature in each respective bed. The overall effect is to maintain a substantially constant average temperature throughout the length of the reactor, or a controlled gradient, thereby preventing overheating, and possible runaway reactions.

The type of temperature-control fluid which is introduced into the reactor will obviously depend upon the type of reaction being carried out. If the reaction is exothermic, such as hydrocracking, a cold quench stream would be introduced. On the other hand, if the reaction is endothermic, such as naptha reforming, a heating fluid may be required. The invention is particularly valuable in multibed hydrocracking reactors, wherein a cold quench stream comprising esssentially hydrogen is introduced between the spaced beds so as to maintain control of the exothermic reaction. Exothermic reactions, such as hydrocracking, are generally conducted at pressures of about 500–4,000 p.s.i., and temperatures in the range of 500° to 1000° F. It is normally desirable in hydrocracking reactions to maintain the temperature gradient within a 10° to 50° F. range.

The aspects of this invention which are capable of illustration are shown in the accompanying drawings.

FIGURE 2 is an enlarged detail of a portion of the reactor of FIGURE 1 included within dotted rectangle II.

FIGURE 3 is a horizontal section on line III—III of FIGURE 1 showing the location of the fluid distribution tubes and the preferred structure of a catalyst retaining gate.

FIGURE 4 is a vertical section on the line IV—IV of FIGURE 3 showing the gate-locking mechanism in the unlocked position.

FIGURE 5 is a modified version of the gate-locking mechanism of FIGURE 4 in the locked position.

Figure 1:
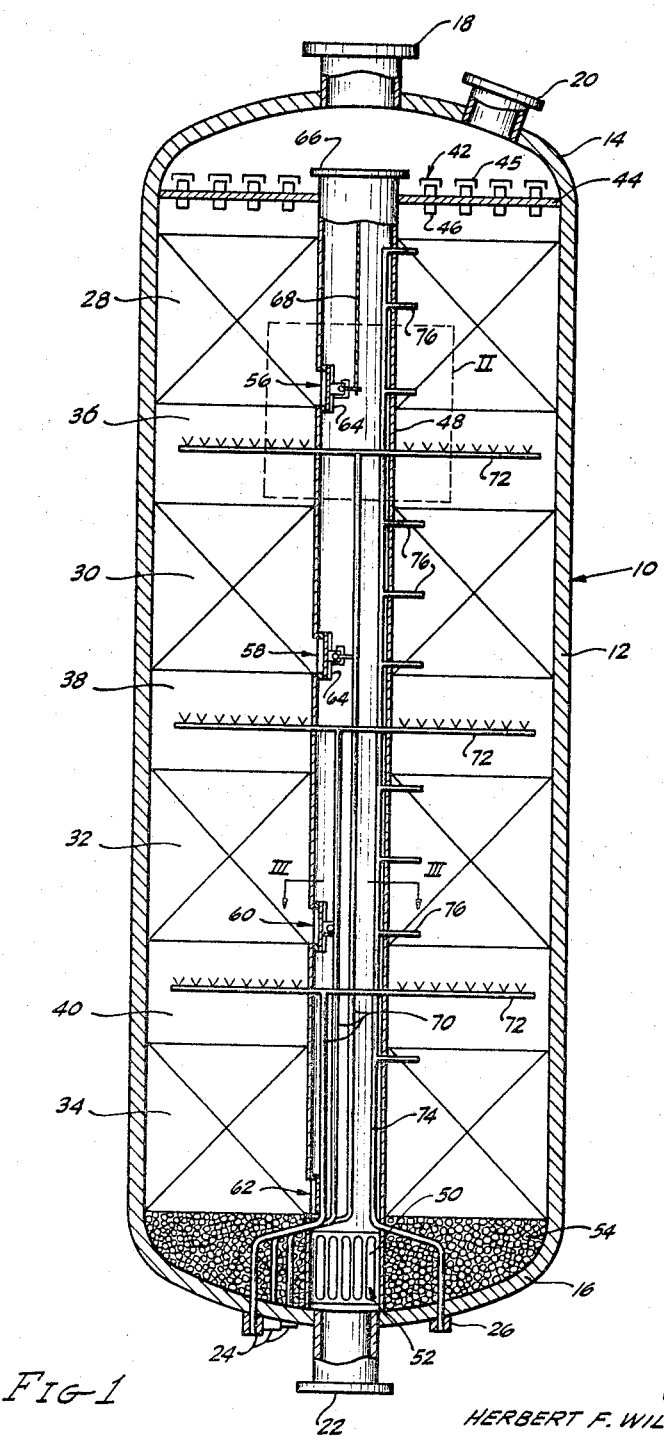
FIGURE 1 is a schematic vertical section of a preferred embodiment illustrating the apparatus of this invention located within a smooth-walled reactor.

Referring to FIGURE 1, reactor 10 comprises a substantially cylindrical, vertical shell 12 having a dish shaped upper end wall 14 and lower end wall 16. The upper end wall 14 includes a nozzle 18 for introducing the fluid reactants and a manway 20 for loading catalyst and otherwise maintaining the vessel. If desired, nozzle 18 and manway 20 may be combined in a single element. The lower end wall is provided with an outlet nozzle 22 for discharging the product effluent, inlets 24 for supplying the reactor with a temperature-control fluid, and at least one thermowell inlet 26 for the thermocouple leads going to the various catalytic beds. Inlets 24 are provided with suitable motor valves (not shown) which may be designed to operate in response to temperatures sensed by thermocouples 76 via temperature controller-recorders (not shown).

Within the shell 12 is located a plurality of spaced catalyst beds 28, 30, 32 and 34, as well as a plurality of intermediate zones 36, 38 and 40, wherein the temperature-control fluid is dispersed. Above the first bed 28 is located a liquid-vapor mixing and distributing device 42 which may consist of a transverse partition 44 fitted with a plurality of bubblecaps 45 and downcomers 46. Similar mixing trays may be included between the various catalyst beds. Also within shell 12 is positioned an elongated conduit generally shown as 48 which extends from above the bubblecap tray 42 to the bottom of the reactor and communicates with the exterior of the vessel through the product outlet 22. The bottom portion of the conduit 48 adjacent the product outlet conduit 22 contains a plurality of slotted openings 50 which allow the product effluent to enter the conduit 48 and exit through the product outlet 22. The slotted openings are covered with a screen 52 which allows the reactants to flow through while preventing the escape of catalyst. The slotted openings 50 also serve to equalize any pressure differential between the interior of the reactor 10 and the interior of the conduit 48. The bottom of the reactor may contain alundum or ceramic balls 54 which surround the screened portion of the slotted central conduit to prevent catalyst from clogging the screen.

Referring specifically to the elongated central conduit 48, the conduit contains rectangular or otherwise shaped apertures 56, 58, 60 and 62 located adjacent the lowermost portion of each catalyst bed 28, 30, 32 and 34 for removing catalyst therethrough. The openings are sealed by removable gate-like closure members 64 which prevent catalyst from entering the interior of the central tube 48 until it has been found desirable to remove the catalyst, at which time the gates are opened and the catalyst allowed to drain into the interior portion of the conduit. For the sake of brevity, only one gate is shown at each level, however, depending upon the size of the reactor and the central conduit, any number of gates may be positioned around the circumference of the conduit. The gates may be opened by removing the cover plate 66 located atop the upper end of the conduit, and lifting the cable or rod 68 so as to unlock the gates 64 and move them out of alignment with the apertures. Generally, one cable is required for each gate so that each catalyst bed may be drained independently of the others. The specific gate structure will be discussed in greater detail in connection with the remaining figures. Also, within the conduit 48 is located a plurality of relatively small diameter, thin-walled tubes 70 for distributing the temperature-control fluid to various dispersal zones 36, 38 and 40 located between respective catalyst beds. A principal advantage of using these internal quench tubes is that, being enclosed within the reactor, they need not be pressure-retaining, as would be required if they were supported outside the reactor. These tubes 70 enter the conduit 48 via the lower end wall of the reactor and the lower side wall of the conduit, thence to the respective levels where they are connected to fluid distributing devices 72 which traverse through the side wall of the conduit 48. Suitable distribution devices include, e.g., perforated radial arms extending from each respective tube, or any other desired arrangement for achieving a substantially uniform radial distribution of fluid, e.g., the apparatus disclosed in copending application Ser. No. 355,870, filed Mar. 30, 1964, now U.S. Patent No. 3,218,249. The conduit 48 also contains a thermocouple lead conduit 74 for housing thermocouple leads going to thermocouples 76 buried within each catalyst bed.

FIGURE 2 illustrates in greater detail the structure and location of the gate in its preferred relationship to the catalyst bed and the dispersal zone. The catalyst bed 28 is packed between the side wall of the reactor (not shown) and the side wall of the conduit 48. The reactants flowing through the catalyst bed 28 enter the dispersal zone 36 via perforated plate 78 which is covered with a layer of alundum balls 80 to prevent the catalyst from clogging the perforations. Plate 78 is supported at its inner circular edge by flanges 79 attached to conduit 48, and at its outer circumference is supported by flanges (not shown) attached to the reactor shell 12. The fluid distribution device 72 traverses the side wall of conduit 48 via a fluid-tight juncture therewith to prevent reactants from entering the interior of the central conduit. The injection tube 70 is provided with thermal expansion bellows 82 to prevent buckling as a result of thermal expansion and contraction.

The catalyst-unloading gate 64 is preferably positioned adjacent aperture 56 at the lowermost portion of the catalyst bed 28. The gate is locked into position by locking mechanism 90 which comprises a cammed rod 94 and lever arm 86 which operates in conjunction with the slotted portion of flanges 96 to urge the gate 64 via arm 92 into sealing contact at 88 with the inner surface of the conduit 48. An included gasket 100 of asbestos or other suitable heat-resistant material may be attached either to the gate or to the inner surface of conduit 48. The specific structure of the gate 64 and cammed locking mechanism 90 is shown in greater detail in the succeeding figures. The catalyst 28 may be removed from the reactor by simply lifting the rod or cable 68 so as to unlock the cammed locking mechanism 90 by rotating the cam counterclockwise via lever 86, and thereafter lifting the gate out of alignment with the opening 56 in the side wall. The gate may be replaced by simply lowering it into position and rotating lever 86 clockwise into the locked position. A thermocouple lead 76 is shown extending through the side wall of the conduit so as to provide a location for sensing temperature in the catalyst bed.

FIGURE 3 illustrates a cross-section of the central conduit 48 wherein the catalyst-unloading gate 64 is shown in greater detail. The locking mechanism 90 comprises a rigidly affixed arm 92 projecting inwardly from a central portion of gate 64, and through the inner end of which is journalled a rotatable rod 94 which is supported at each end by, and rotates in, the slotted portions of flange members 96 secured to the side wall of conduit 48. The rod 94 includes cams 98 at opposite ends thereof which are shown in greater detail in FIGURES 4 and 5, and a lever arm 86 for rotating the cammed rod. By rotating the lever arm clockwise, the cams 98 bear horizontally upon the side walls of the slots in the ends of the flanges 96 to urge the gate 64 into contact with the sealing gasket 100.

In instances where it is desirable to maintain the interior of conduit 48 at a substantially lower temperature than the interior of the reactor, an insulating liner 102 is provided. For convenience, the temperature-control fluid injection tubes 70 are best positioned adjacent the side-wall of the conduit 48 so as to reduce chances of catalyst clogging or bridging the interior of the conduit during the unloading operation.

FIGURE 4 illustrates the cammed locking mechanism of FIGURE 3 along line IV—IV in its unlocked position, thus allowing the gate to be removed by simply raising or lifting on the braided cable 68. No guide is provided, so that the gate may be completely removed from conduit 48.

FIGURE 5 illustrates one modification of the cammed locking mechanism of FIGURE 4. In this modification, flange 96 contains a slotted guide 84 for maintaining gate alignment while moving the cammed rod 94 into and out of its locked position. The locking mechanism consists of the rod 94, attached cam 98, and lever arm 86, rod 94 being supported in the slotted ends of flanges 96. From the locked position the gate is released by rotating the rod 94 counterclockwise via lever-arm 86. The lever-arm 86 is rotated by lifting cable 68 to release cam 98, thereby allowing the gate to be raised while maintaining alignment via rod-guide 84. By reversing the procedure the gate is locked into sealing contact.

There are many modifications and noncritical features of this invention not specifically referred to herein which will be apparent to those skilled in the art, and which are within the scope of the invention as set forth in this specification and encompassed in the following claims.

Having thus described the invention, I claim:

1. Catalytic reactor apparatus comprising in combination:
   (a) an elongated, cylindrical, pressure-retaining vessel comprising a side wall portion and end walls at opposite ends thereof, said side wall portion being essentially free of nozzles and other openings therein;
   (b) fluid inlet means disposed in one end wall for introducing a fluid reactant stream to said reactor;
   (c) fluid outlet means disposed in the lower end wall for removing product therefrom; and
   (d) an elongated conduit closed at its upper end disposed coaxially within said vessel, and communicating with the exterior thereof through said lower end wall, said conduit comprising a plurality of vertically spaced apertures in the side-wall thereof for draining catalyst from said vessel to the interior of said conduit, a plurality of closure means removably attached to said conduit for closing and sealing said apertures during reactor operation, and vent means disposed in said conduit side wall adjacent said lower end wall for delivering fluid from the interior of said vessel to said fluid outlet means, and for maintaining pressure equilibrium between the interior of said conduit and the interior of said vessel.

2. Apparatus as defined in claim 1 wherein each of said closure means comprises a closure plate having an arm rigidly secured at one end to a central portion of said plate and extending inwardly therefrom, the opposite end of said arm being provided with a journal through which is positioned a rotatable rod having cam-like end portions, a pair of inwardly extending flanges secured to the interior of said conduit on either side of said aperture, each having a slot near its inner end in which said cam-like end portions are engaged and supported, a lever-arm secured to said rod for rotating the cam-like end portions thereof into cammed contact with the inner wall of said slots so as to urge said closure plate into sealing contact with the periphery of said aperture, and means attached to said lever-arm and extending upwardly to near the top of said conduit for rotating said lever-arm.

3. Apparatus as defined in claim 1 including in combination therewith a plurality of fluid injection tubes disposed lengthwise within said conduit for injecting a temperature-control fluid into said dispersal zones, each of said fluid-injection tubes communicating with the exterior of said reactor through said lower end-wall and terminating upwardly at vertically spaced intervals in said conduit, the upper end of each tube communicating with a radial fluid-distributing means extending through the side wall of said conduit into the annulus between said conduit and said vessel and adapted to distribute fluid substantially uniformly over the cross-sectional area of said annulus.

4. Apparatus as defined in claim 1 including in combination therewith, plate-supporting means attached circumferentially to the exterior of said conduit at vertically spaced intervals thereon, and a plurality of foraminous, circular plates for supporting catalyst disposed horizontally in the annulus between said conduit and said side walls of said vessel, said plates being supported at their outer periphery by said vessel side walls and at their inner periphery by said plate-supporting means.

5. Apparatus as defined in claim 4 wherein one of said spaced apertures is positioned immediately above each of said foraminous circular plates.

6. Apparatus as defined in claim 4 including in combination therewith, a plurality of fluid injection tubes disposed lengthwise within said conduit for injecting a temperature-control fluid into said dispersal zones, each of said fluid-injection tubes communicating with the exterior of said reactor through said lower end wall and terminating upwardly at vertically spaced intervals in said conduit, the upper end of each tube communicating with a radial fluid-distributing means extending through the side wall of said conduit into the annulus between said conduit and said vessel and adapted to distribute fluid substantially uniformly over the cross-sectional area of said annulus.

7. Apparatus as defined in claim 6 including in combination therewith a plurality of thermocouple leads disposed lengthwise within said conduit, each communicating through the wall of said conduit with a thermocouple spaced in the annulus between said conduit and said vessel.

8. A catalytic reactor including apparatus for injecting a temperature-control fluid into a plurality of dispersal zones therein, comprising in combination:
(a) an elongated, cylindrical, pressure-retaining vessel comprising a side wall portion and end walls at opposite ends thereof, said side wall portion being essentially free of nozzles and other openings therein;
(b) fluid inlet means disposed in one end wall for introducing a fluid reactant stream to said reactor;
(c) fluid outlet means disposed in the lower end wall for removing product therefrom;
(d) an elongated conduit closed at its upper end disposed coaxially within said vessel, and communicating with the exterior thereof through said lower end wall, and having vent means in the lower side wall thereof adjacent said lower end wall for delivering fluid from the interior of said vessel to said fluid outlet means and for maintaining pressure equilibrium between the interior of said conduit and the interior of said vessel; and
(e) a plurality of fluid injection tubes disposed lengthwise within said conduit for injecting a temperature-control fluid into said dispersal zones, each of said fluid-injection tubes communicating with the exterior of said reactor through said lower end wall and terminating upwardly at vertically spaced intervals in said conduit, the upper end of each tube communicating with a radial fluid-distributing means extending through the side wall of said conduit into the annulus between said conduit and said vessel and adapted to distribute fluid substantially uniformly over the cross-sectional area of said annulus.

9. Apparatus as defined in claim 8 including in combination therewith a layer of thermal insulation on the interior surface of said conduit.

10. Apparatus as defined in claim 8 including in combination therewith plate-supporting means attached circumferentially to the exterior of said conduit at vertically spaced intervals thereon; and a plurality of foraminous, circular plates for supporting catalyst disposed horizontally in the annulus between said conduit and said side walls of said vessel, said plates being supported at their outer periphery by said vessel side walls and at their inner periphery by said plate-supporting means.

11. A catalytic reactor adapted to contain and support a plurality of spaced catalyst beds therein, comprising in combination:
(a) an elongated, cylindrical, pressure-retaining vessel comprising a side wall portion and end walls at opposite ends thereof, said side wall portion being essentially free of nozzles and other openings therein;
(b) fluid inlet means disposed in one end wall for introducing a fluid reactant stream to said reactor;
(c) fluid outlet means disposed in the lower end wall for removing product therefrom; and
(d) an elongated conduit closed at its upper end and supported from said bottom end wall coaxially within said vessel, and communicating with the exterior thereof through said lower end wall, and having vent means in the lower side wall thereof adjacent said lower end wall for delivering fluid from the interior of said vessel to said fluid outlet means, and for maintaining pressure equilibrium between the interior of said conduit and the interior of said vessel, said conduit also comprising a plurality of vertical spaced apertures in the side wall thereof for draining catalyst from said vessel to the interior of said conduit, and including in combination therewith a plurality of closure means removably attached to said conduit for closing and sealing said apertures during reactor operation;
(e) plate supporting means attached circumferentially to the exterior of said conduit at vertically spaced intervals thereon; and
(f) a plurality of foraminous, circular plates for supporting catalyst disposed horizontally in the annulus between said conduit and the side walls of said vessel, said plates being supported at their outer periphery by said vessel side walls and at their inner periphery by said plate-supporting means.

12. Apparatus as defined in claim 11 wherein each of said closure means comprises a closure plate having an arm rigidly secured at one end to a central portion of said plate and extending inwardly therefrom, the opposite end of said arm being provided with a journal through which is positioned a rotatable rod having cam-like end portions, a pair of inwardly extending flanges secured to the interior of said conduit on either side of said aperture, each having a slot near its inner end in which said cam-like end portions are engaged and supported, a lever-arm secured to said rod for rotating the cam-like end portions thereof into cammed contact with the inner wall of said slots so as to urge said closure plate into sealing contact with the periphery of said aperture, and means attached to said lever-arm and extending upwardly to near the top of said conduit for rotating said lever-arm.

References Cited
UNITED STATES PATENTS

| | | | |
|---|---|---|---|
| 2,369,478 | 2/1945 | Mekler et al. | 23—288 |
| 2,317,449 | 4/1943 | Flock | 23—288 |

JAMES H. TAYMAN, Jr., *Primary Examiner.*

U.S. Cl. X.R.

208—108; 214—17; 222—376; 263—19